Patented Oct. 11, 1949

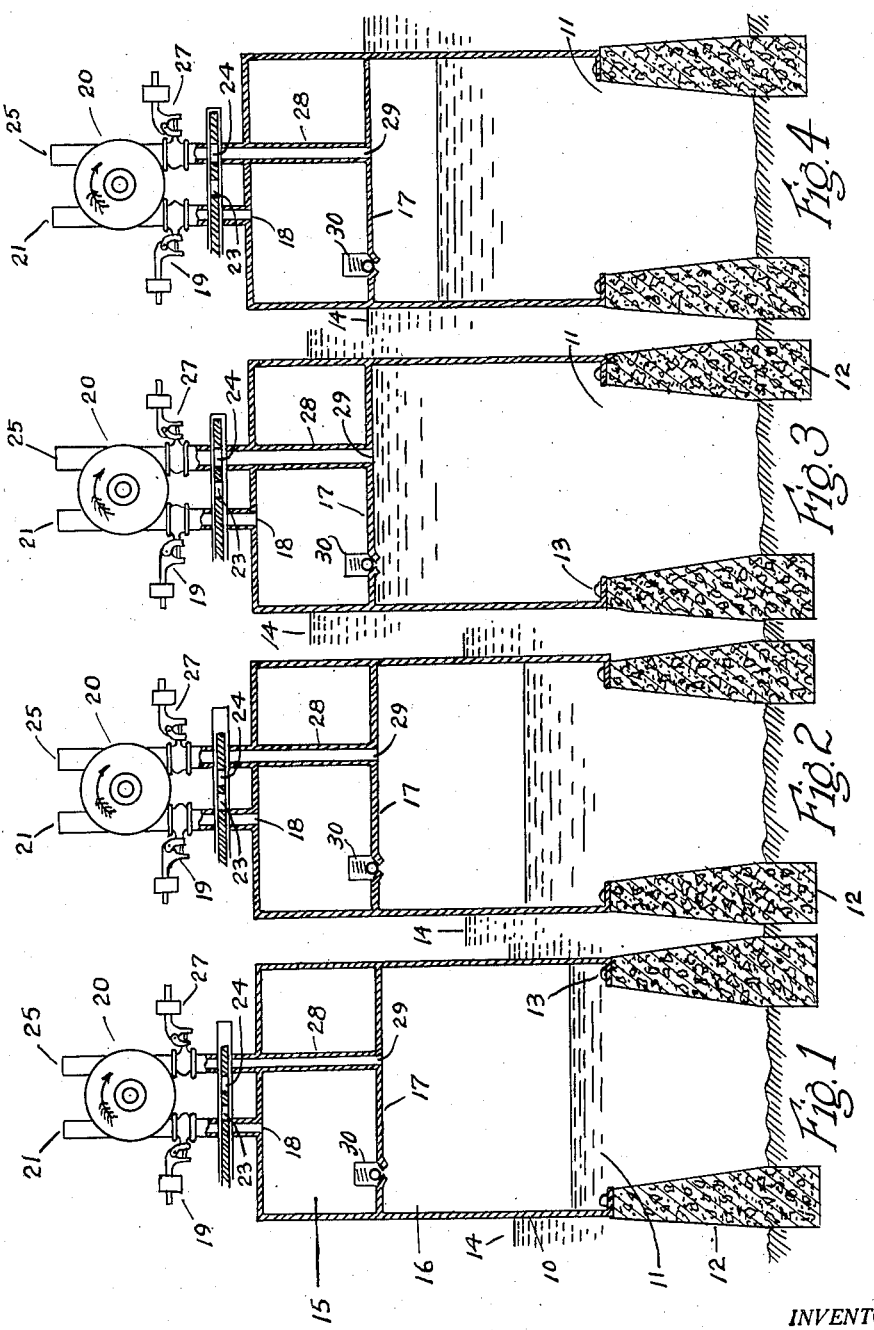

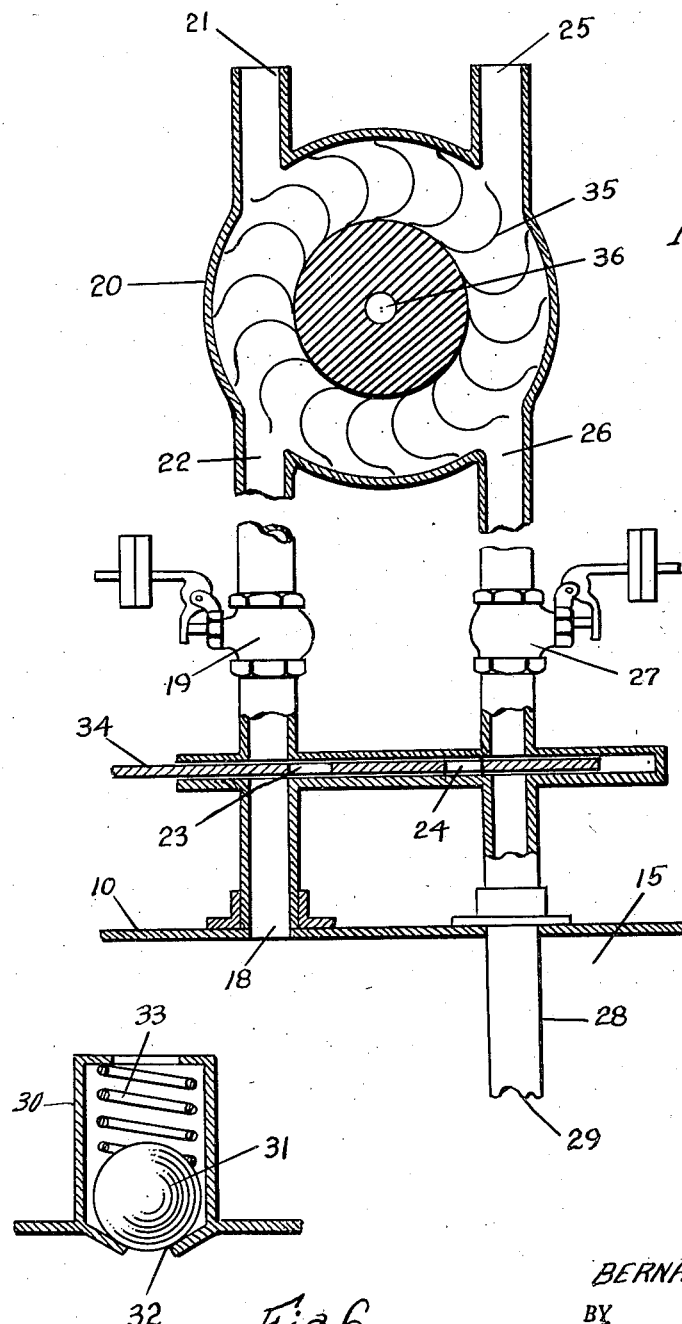

2,484,183

UNITED STATES PATENT OFFICE 2,484,183

HYDROPNEUMATIC POWER PLANT

Bernard J. Paulson, Waukesha, Wis.

Application April 17, 1945, Serial No. 588,780

1 Claim. (Cl. 60—62)

My invention relates to hydropneumatic power plants and more specifically to a power plant that has, as its actuating means, the height variation of the water level, due to either tide variation or the manual control of the water level.

The object of my invention is to provide a hydropneumatic power generating means actuated by the rise and fall of a water level due to flood and ebb tide or the manual damming and releasing of a water supply.

Another object of my invention is to utilize inhalation and exhalation of air in and out of a container caused by the rise and fall of the water level against a fixed resistance.

Still another object of my invention is to employ the air pressure during the inhalation and exhalation process to actuate the current generating means for the production of electric current.

The power generating equipment provides a means of utilizing the rise and fall of the flood and ebb tide to build up reserve air pressure by means of the breather method of inhaling and exhaling air and causing the air pressure produced to pass through suitable turbines or slide valve engines to generate power which may be applied to the operation of electric generators or any other type of device.

Other and further objects of my invention will become more apparent as the description proceeds when taken in conjunction with the drawings, in which, Figure 1 is a cross-sectional view of the device illustrating its construction and showing the water level at the initial operational stage.

Figure 2 is a similar view of the device as shown in Figure 1, showing the water level outside of and within the enclosure on a rising tide.

Figure 3 is a similar view of the device as shown in Figure 1, showing the water level at high tide.

Figure 4 is a similar view showing the water level receding during ebb tide producing a vacuum and reversing the flow of air.

Figure 5 is a fragmentary, cross-sectional view of a conventional turbine construction, showing pressure regulating valves and a slide-valve assembly for opening and closing the flow of air to and from the turbine, and, Figure 6 is a conventional ball-type valve equipped with resilient means for permitting the air to travel only one way against the spring tension.

Similar characters of reference indicate corresponding parts throughout the several views and referring now to the same, the character 10 shows a large tank, preferably rectangular, constructed of steel properly supported and of a size to provide a pre-determined cubic capacity. The top of the tank 10 is closed and of a large diameter to provide a large surface area against which the water produces a pressure varying according to the water head on the outside of the tank due to the rise and fall of the tide, or due to any other form or method such as the alternate damming and sluicing of the water in a river or the like. The tank 10 is open at its bottom 11 and is shown supported by concrete piers 12 rigidly set on a foundation in the sea bottom and provided with suitable anchorage at 13 for their support.

The side walls 10 are extended below the surface 14 of the water at ebb tide, in proper ratio to the amount of pressure developed on the flood tide cycle, to prevent the escape of compressed air from the air chamber through the water rising within the tank. Obviously, the water level inside of the tank is less than the water head on the outside and this differential would be compensated for by a downward skirt of the tank walls, extending below the minimum ebb tide level to the proper pre-determined depth, calculated on a basis of a head of water 33 feet high reducing the cubic volume of air within a confined receptacle such as this tank to fifty per cent of its original volume, thereby establishing a perfect water seal against the escape of air from the tank through the water into the outside atmosphere.

The tank air chamber is re-charged with air at atmospheric pressure by means of the intake flow of air through the turbine or slide-valve engine on the inhalation or ebb-flow cycle, thus being provided with a full volume re-charge of air at sea-level pressure when the flood tide or flow cycle begins.

At the upper end of the tank is shown an air pressure reservoir or enclosure 15 which is separated from the lower enclosure 16 by means of a horizontal partition 17 properly braced. At the top of the enclosure 15 is shown a turbine construction, illustrated in Figure 5, and provided with an outlet 18 leading to a pressure regulator 19 and from it to a turbine 20 shown merely as an example of a motive means for a generator or the like. The turbine 20 is shown having an outlet 21 in direct alignment with its inlet 22. Between the inlet 22 of the turbine 20 and the outlet 18 at the tank is shown a slide valve having ports 23 and 24. There is another inlet 25 shown at the top of the turbine 20, and an outlet 26 on the turbine opposite the inlet 25 leads to another pressure regulator 27 in the outlet tube 28 and terminating into an opening 29 in the partition 17. This tube 28 extends entirely through the auxiliary enclosure 15 and is arranged to receive the port 24 in the slide valve arrangement. The partition 17 is also provided with a valve construction 30, as shown in Figure 6, consisting of a spherical member 31 resting against a lower seat 32 and urged into a closed position by means of a resilient member 33.

In operation, the device functions as follows:

As the water level 14 rises, it permits the air having entered the tank 10 through the power unit intake 25 to be trapped and compressed within the enclosure 16. This pressure increases as the flow tide raises the depth of the water on the outside of the tank, and this air, under pressure, is forced past the sealing means 31 in the valve arrangement 30 in the partition 17 into the enclosure 15. Before the tide rises, the slide valve 34 is pulled forward closing off both the ports 23 and 24 and with it both port openings 18 and 29. The reservoir 15 acts as a storage tank for the compressed air which reaches its maximum pressure when the tide reaches a high point, as shown in Figure 3. The slide valve 34 is moved so that the port 24 is in direct alignment with the outlet 26 of the tube 28. As the tide recedes and the water level 14 goes down, it will cause a positive vacuum in the enclosure 16, thereby inhaling air through the port 25 in the turbine 20 causing the blades 35 to revolve and thereby revolve the shaft 36 which is directly connected with a generator or the like, not shown. Obviously, the valve 34 is not actuated until the ebb tide has brought the water level 14 down away from the top of the tank 10 so that when the port 24 is brought in direct alignment with the tube 28a flow of air into the opening 25 will cause the turbine to revolve.

When the water level 14 recedes to a point near the ebb flow level in the tank 10, the valve 34 is moved forward so that the port 23 is in direct alignment with the openings 18 and 22, thereby causing the air in the auxiliary enclosure 15 to engage the blades 35, thus revolving the shaft 36, and, as the water level 14 is again raised, it will compress the air in the enclosure 16 to a point where it reaches a pressure greater than the pressure within the auxiliary enclosure 15, causing the air from the enclosure 16 to pass into the auxiliary enclosure 15 through the valve 30. Obviously, as many of these valves 30 may be employed as deemed necessary. In this manner, the reserve pressure in the enclosure 15 is used while the static period of the tide takes place. In other words, the reserve pressure is utilized while the change from ebb tide to flow tide takes place and vice versa. The pressure regulator valves 19 and 27 in the air ducts will have a tendency to permit air under a constant predetermined pressure to engage the blades 35 without regard to the water head on the outside of the tank.

The generator being attached directly to the shaft 36 to produce current, the generator will be actuated by the air pressure during either the inhalation or exhalation period through a turbine, as shown, or through a slide-valve engine or the like.

It is manifest that the large tank 10 serves as a huge air chamber for the concentration and compression of air induced by the rise of the water within the tank and conversely for the creation of a huge vacuum against which an intake flow of air actuates the power unit 20 in the same manner as the passage of compressed air from the auxiliary tank which actuates the power unit 20. The turbine 20 or the slide-valve engine would be designed and constructed for low pressure operation utilizing whatever air and vacuum pressure are available, controlled at a pre-determined pressure by the regulating valves, irrespective of the amount of rise and fall of the compression or vacuum medium such as the ebb and flow tide or the impounding of water from a running stream or the like.

The power generated during the compression or exhalation cycle logically depends upon the height or rise of the water within the tank. A head of 33 feet of water outside of the tank creating a pressure of 14.7 pounds per square inch and a lesser head of water creating a proportionately lesser pressure.

On the inhalation or vacuum cycle an initial intake force or pressure of 14.7 pounds per square inch is established at the beginning of the ebb tide or water recession within the tank regardless of the height of the tank, based on the fact that a perfect vacuum has been established by the rise of the water within the tank to the utmost ceiling of the tank 10 during the exhalation or compression cycle.

In considering power operation, both in the exhalation and inhalation cycles in the beginning of the operation, an initial static period would be established during which the power unit itself would be inoperative in order to build up a reserve pressure within the enclosure 15 to produce the desired power results, for example, on the flood tide cycle it would be well to permit compression to progress within the tank until an outside head of 4.6 feet of water has developed, thereby creating an internal air pressure of two pounds per square inch. The static period which will be approximately one and one-half hours of elapsed time on the basis of six hours and twenty minutes for a flood tide of twenty feet thus providing a net power cycle period of approximately four hours and fifty minutes for flood tide operation.

Similarly, a preliminary static period would occur before the inhalation or vacuum cycle permitting a drop of several feet in the recession of ebb tide before the power unit is automatically cut in to work against a full vacuum pressure of 14.7 pounds per square inch. This pressure is gradually adjusted by the regulating valves. The static periods are taken care of by the air under pressure stored in the auxiliary enclosure 15.

The power output of the unit may be maintained and may be collaborated by the square inch area of the top of the tank, regardless of the height of the flow of ebb tide. When the height of the water at flood tide is less, the area of the tank must be increased in proportion.

What I claim and desire to secure by Letters Patent in the United States is:

A hydropneumatic power unit of the character described comprising a main air tank, an auxiliary air tank, said auxiliary tank connected with said main tank, said main tank open to the admission of water as a sealing means at its bottom and closed at its top and sides, the sides of said main tank extending below the water level at ebb tide, said main tank rigidly mounted and anchored at its lower end, the upper end of said tank rising above the highest water level, an inlet port extending through said auxiliary tank to the enclosure formed by said main tank, an outlet port extending from said auxiliary tank for permitting air to travel one way from said main tank to said auxiliary tank, said auxiliary tank being provided with an outlet port, in combination with an actuating means connected to the outlet port of said auxiliary tank and the inlet port of said main tank, slidable valve means for opening one of said ports at a time, said valve means disposed between said actuating means and tank, said actuating means designed to permit the flow of outside air into said main tank and out of said auxiliary tank and exhausting compressed air actuated thereby.

BERNARD J. PAULSON.

REFERENCES CITED

The following references are of record in the file of this patent:

UNITED STATES PATENTS

| Number | Name | Date |
| --- | --- | --- |
| 610,790 | Beckers | Sept. 13, 1898 |
| 649,396 | Boudreaux | May 8, 1900 |
| 875,042 | Bissell | Dec. 31, 1907 |
| 1,251,849 | Vernon | Jan. 1, 1918 |
| 1,920,104 | Pateras-Pescara | July 25, 1933 |

FOREIGN PATENTS

| Number | Country | Date |
| --- | --- | --- |
| 11,481 | Great Britain | May 27, 1896 |